United States Patent [19] [11] Patent Number: 4,754,709
Gramse et al. [45] Date of Patent: Jul. 5, 1988

[54] RAILROAD CAR FOR CONTAINERS HAVING GUIDES FOR THE CONTAINERS

[75] Inventors: Harold E. Gramse, Lansing, Ill.; H. Conor Nolan, North Fort Myers, Fla.; James J. Schuller, Crete, Ill.

[73] Assignee: Thrall Car Manufacturing Company, Chicago Heights, Ill.

[21] Appl. No.: 919,480

[22] Filed: Oct. 16, 1986

[51] Int. Cl.⁴ .............................................. B60P 1/00
[52] U.S. Cl. .................................... 105/355; 105/404; 105/411; 410/54; 410/94
[58] Field of Search ............... 105/355, 374, 404, 411; 410/44, 52, 54, 87, 94, 121, 155

[56] References Cited

U.S. PATENT DOCUMENTS

| | | | |
|---|---|---|---|
| 3,415,205 | 12/1968 | Gutridge | 410/54 |
| 3,444,824 | 5/1969 | Gutridge | 410/54 |
| 3,762,340 | 10/1973 | Udaloff | 410/94 |
| 3,805,709 | 4/1974 | Schuller et al. | 410/54 |
| 4,091,742 | 5/1978 | Cordani | 410/94 |
| 4,400,121 | 8/1983 | Kruff et al. | 104/64 |
| 4,456,413 | 6/1984 | Paulick | 410/65 X |
| 4,624,188 | 11/1986 | Kaleta | 105/355 |
| 4,648,764 | 3/1987 | Paulick | 410/121 X |

FOREIGN PATENT DOCUMENTS 781796  8/1957  United Kingdom ................. 410/54

Primary Examiner—Johnny D. Cherry
Assistant Examiner—Russell D. Stormer
Attorney, Agent, or Firm—Marshall, O'Toole, Gerstein, Murray & Bicknell

[57] ABSTRACT

A railroad car for carrying a container comprising a car body supported by rail trucks adapted for movement over a railroad; the car body having opposing side walls and an end wall near each end connected to the side walls with said side walls and end walls defining a well in which a container can be received and supported; and guides mounted along each side wall for effectively reducing the width of the well space so as to center in the well a container having a width significantly less than the well width so as to limit sideward movement of the container in the well when the car rocks.

3 Claims, 5 Drawing Sheets

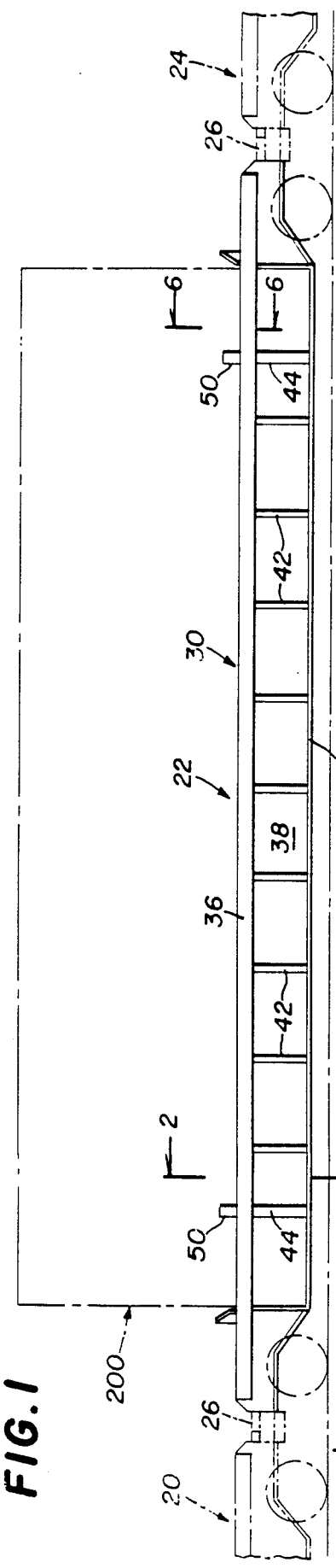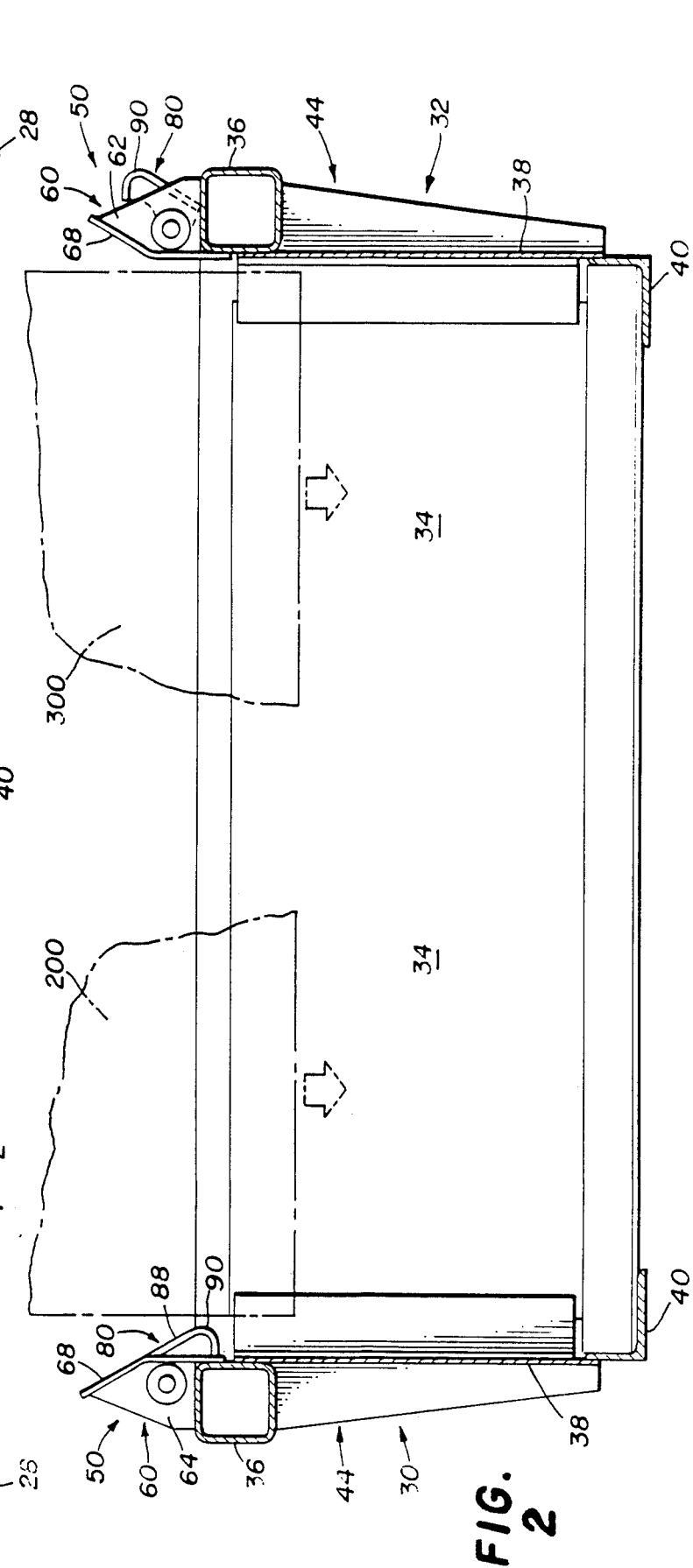

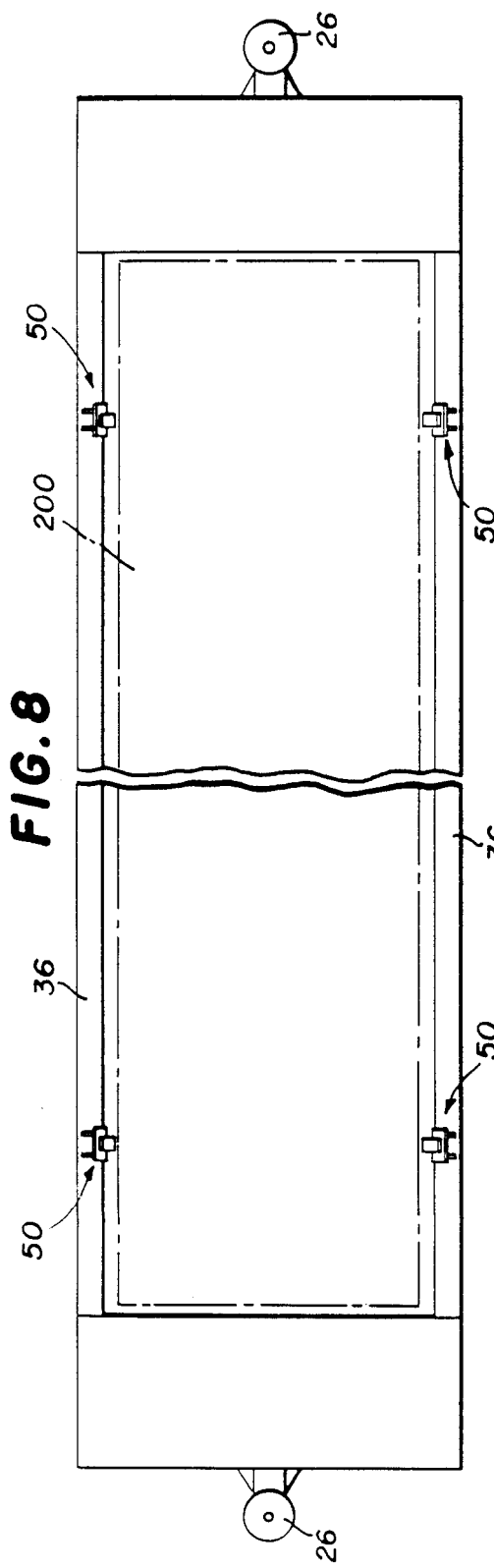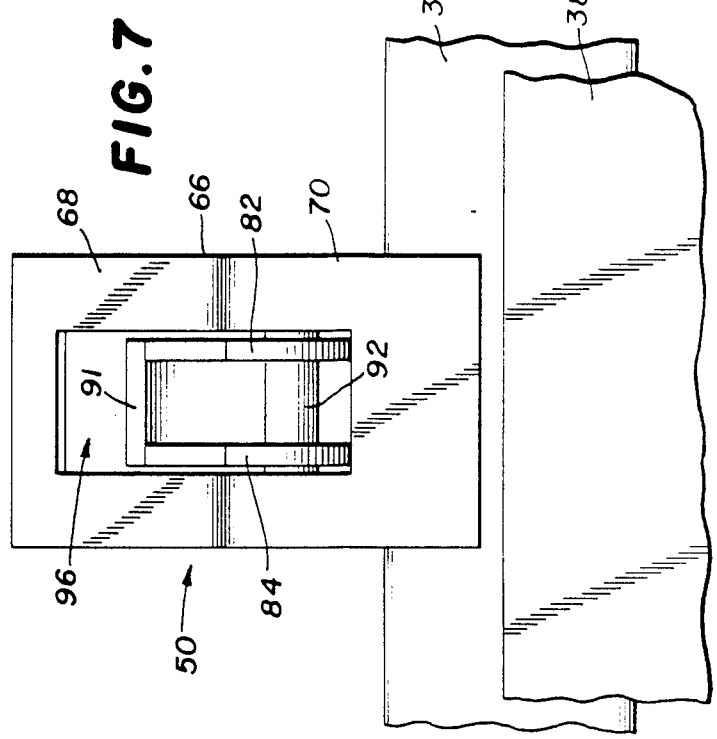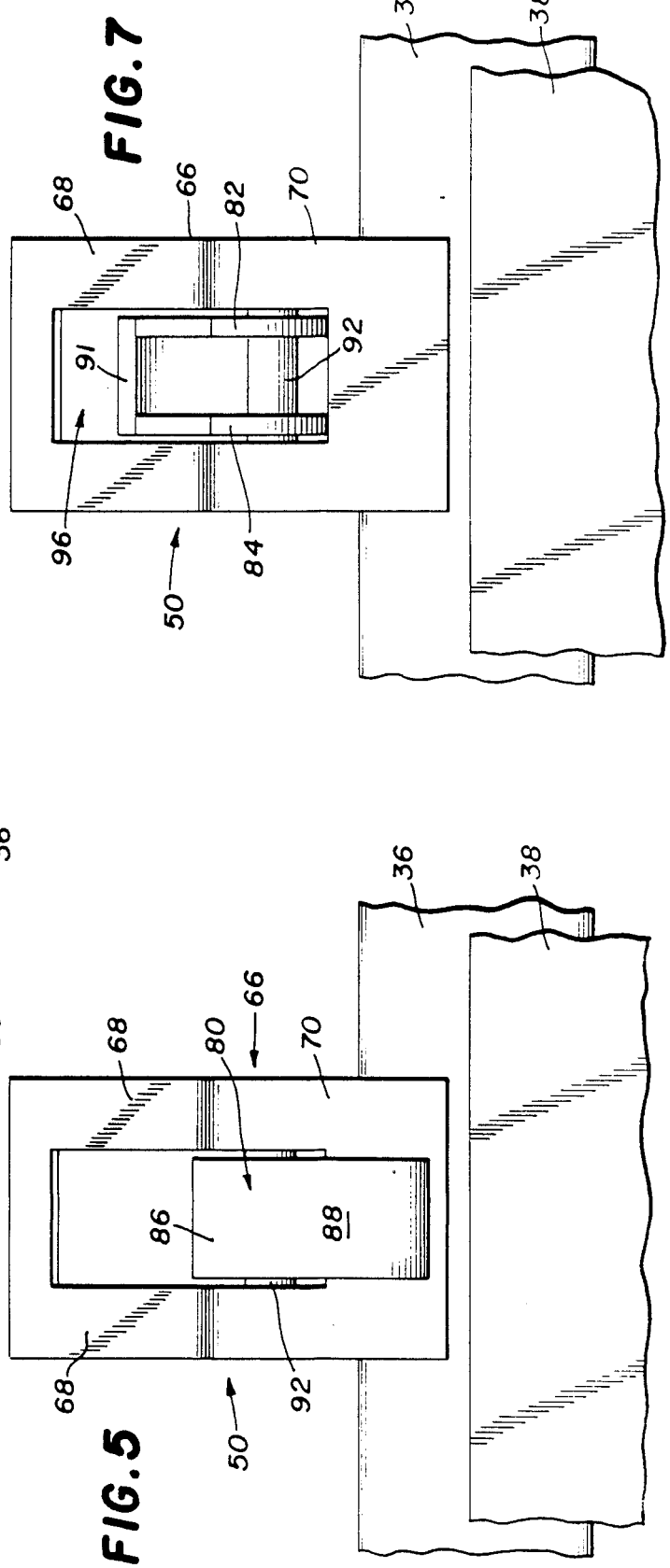

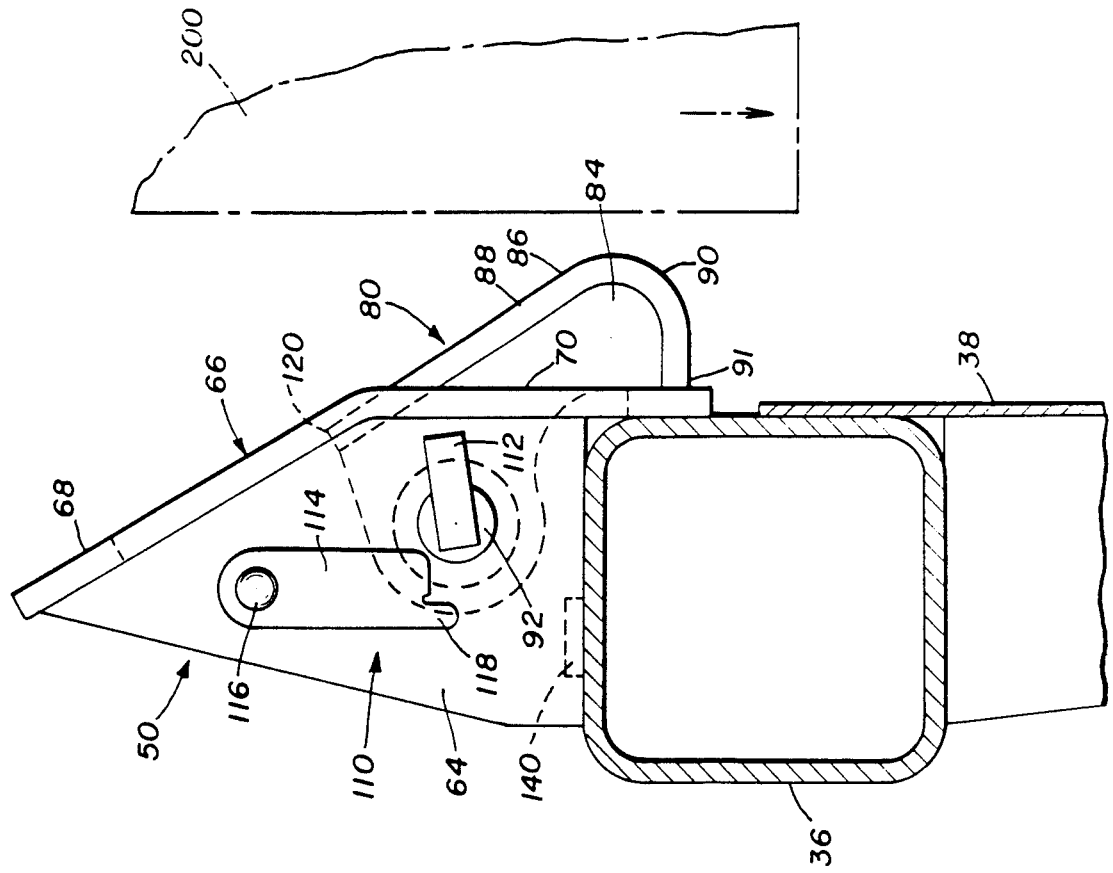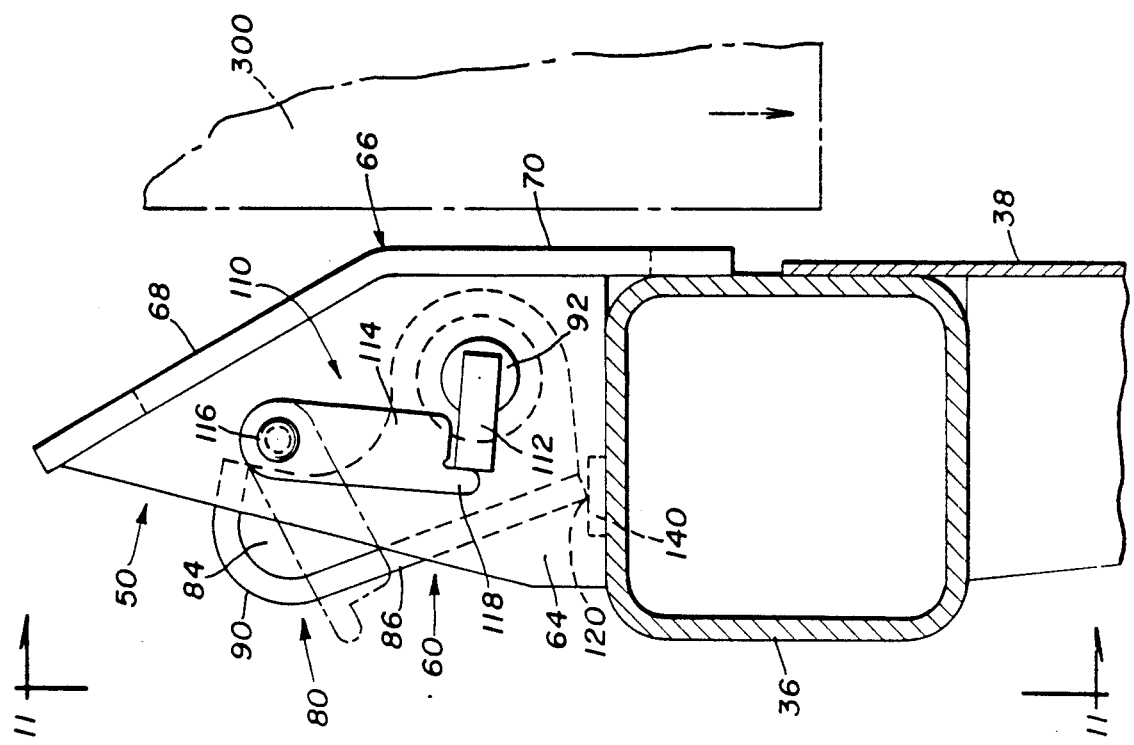

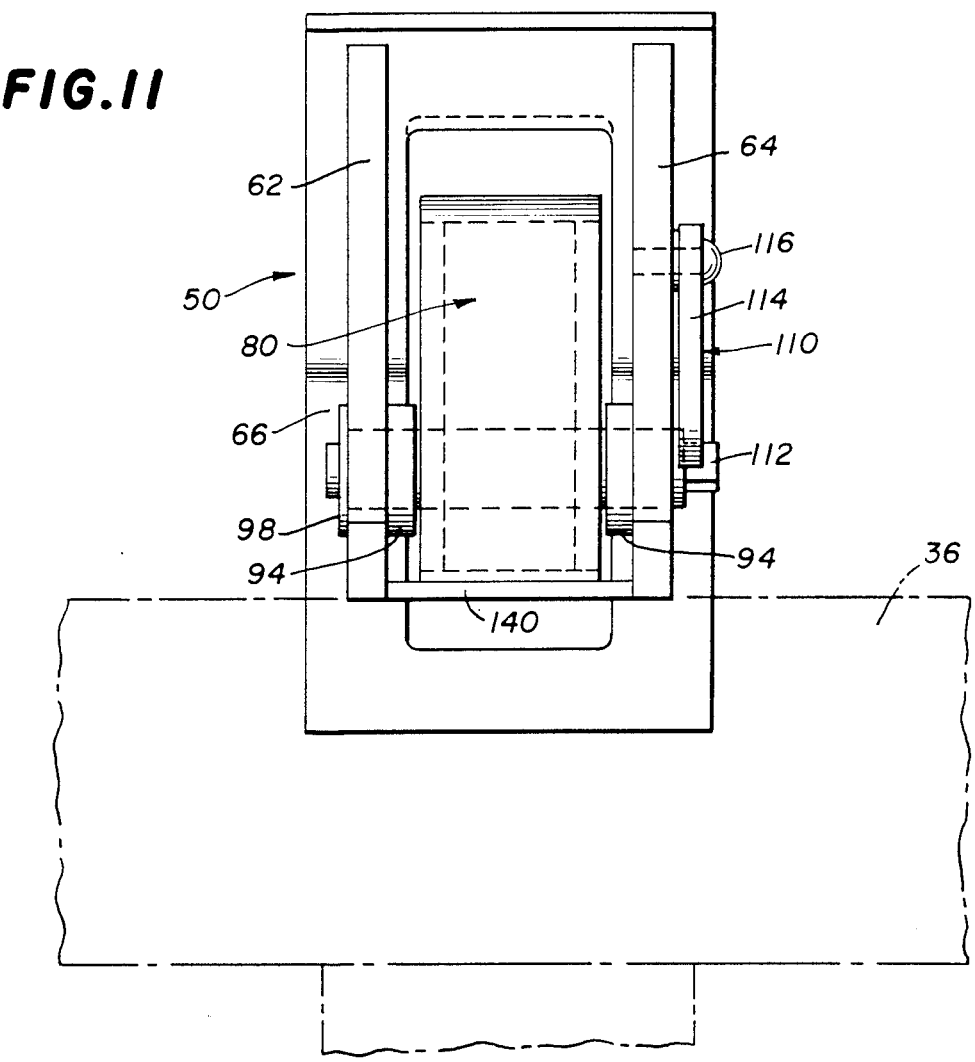
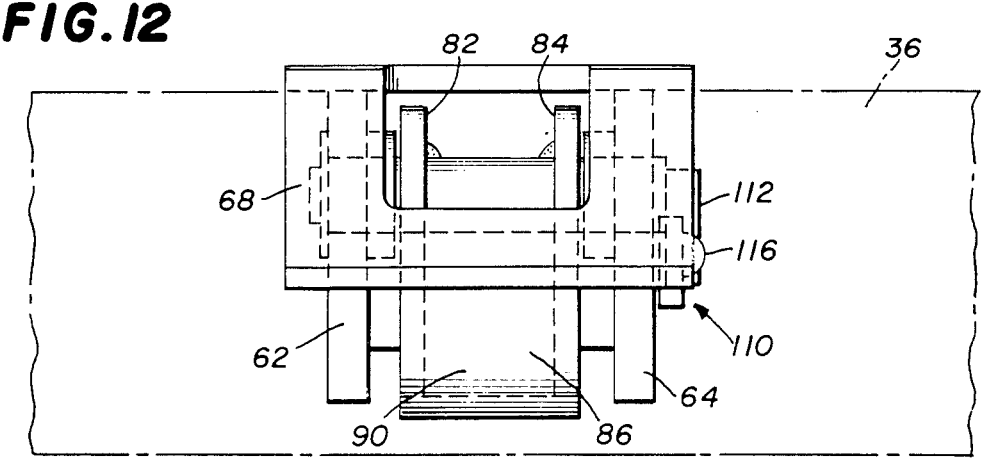

RAILROAD CAR FOR CONTAINERS HAVING GUIDES FOR THE CONTAINERS

This invention relates to railroad cars. More particularly, this invention is concerned with an improved railroad car for carrying one or more cargo containers of two different widths.

BACKGROUND OF THE INVENTION

Railroad box cars have been in use for many years transporting a wide variety of cargo. Box cars are recognized as being primarily useful when the cargo can be loaded directly in the car from a siding adjacent its production without any prior shipping involving substantial labor in loading and unloading the goods, as from a truck. The same applies at the shipping destination.

In recent years it has been found increasingly efficient to ship cargo in large containers by sea, railroad and highway. Shipping in this manner avoids unpacking the cargo between the time the container is packed by the shipper and received by the customer thereby avoiding extra labor, avoiding breakage and theft in handling and reducing delivery time. These benefits are realized because the containers are sized and shaped to be carried by highway trucks and trailers, special railroad cars and container carrying ships.

One type of railroad car which is particularly suitable for carrying containers is referred to as a well car. Such a car has side and end walls and a partial or full floor thereby defining a well or recessed space into which one or more containers can be longitudinally positioned. The container sides are generally at least two to three times higher than the depth of the well space. Additionally, the containers can be double stacked when desired to increase the shipping load.

Well cars of the described type suitable for carrying containers, and also highway trailers, are disclosed in U.S. Pat. Nos. 4,091,742; 4,400,121; and 4,456,413.

The width of the containers placed in the well is usually either eight feet or eight feet six inches. Accordingly, the well width must be slightly larger than eight feet six inches to accommodate the widest container. However, an eight feet wide container is difficult to center in such an oversized well. Even when initially centered accurately, rocking of the car in transit can cause the container to shift to one side of the car causing it to tilt. This could place the car in an unsafe condition and perhaps cause an accident. Also, the container cargo could be damaged as a result of the unbalanced condition of the load. There is accordingly a need for an improved well car which can receive and securely maintain centered therein containers having two different widths with one being considerably narrower than the well width required to receive the larger container.

SUMMARY OF THE INVENTION

A railroad car for carrying a container is provided comprising a car body supported by rail truck means adapted for movement over a railroad; the car body having opposing side walls and an end wall near each end connected to the side walls with said side walls and end walls defining a well in which a container can be received; means for supporting the bottom of a container, when in the well; and guide means mounted along each side wall for effectively reducing the width of the well space so as to center in the well a container having a width significantly less than the well width and limit sideward movement of the container in the well when the car rocks.

The guide means can comprise at least two spaced apart guide units along each side wall.

Each guide unit can have an element movable from a stored position in which the width of the well is maximum to an operable guide position which reduces the well width to center the container. The element can be movable about an axis and the element can be maintained in both the stored position and the operable guide position by gravity. Also, the movable element can be located on top of the side wall and the axis can be horizontal.

The movable element can have a forward nose portion which, when the element is in operable guide position, is adapted to be adjacent a container wall in the well. Also, the element can have a downwardly sloped portion, extending to the nose portion, against which a container bottom side corner can slide to guide a container being lowered into the well.

Each guide unit can include a stationary base joined to the top of the side wall. The movable element can be mounted to the base to rotate about a horizontal axis. The base can have a sloped surface for guiding a container, having a width approximately the same as but smaller than the well width, being lowered into the well.

The base sloped surface and the movable element sloped portion can form a common plane when the movable element is in operable guide position.

The guide unit can be provided with a stop mechanism to prevent accidental rotation of the movable element from stored position to operable guide position.

BRIEF DESCRIPTION OF THE DRAWINGS

FIG. 1 is a side elevation of a well car according to the invention for carrying containers coupled to similar cars at each end;

FIG. 2 is a sectional view through the car of FIG. 1 taken along the line 2—2;

FIG. 5 is a front elevational view of the guide unit in operable position taken along the line 5—5 of FIG. 3;

FIG. 7 is a front elevational view of the guide unit in stored position taken along the line 7—7 of FIG. 6;

FIG. 8 is a plan view of the car of FIG. 1 with the guide units in operable position securing a small container in the well space;

FIG. 9 is similar to FIG. 3 but shows the container guide unit equipped with a stop mechanism which keeps the movable element from being moved out of stored position accidentally;

FIG. 10 is similar to FIG. 9 but it shows the stop mechanism when the movable element is in operable position;

FIG. 11 is a rear elevational view taken along the line 11—11 of FIG. 9; and

FIG. 12 is a plan view of the container guide unit shown in FIG. 11.

DETAILED DESCRIPTION OF THE DRAWINGS

Figure 3:
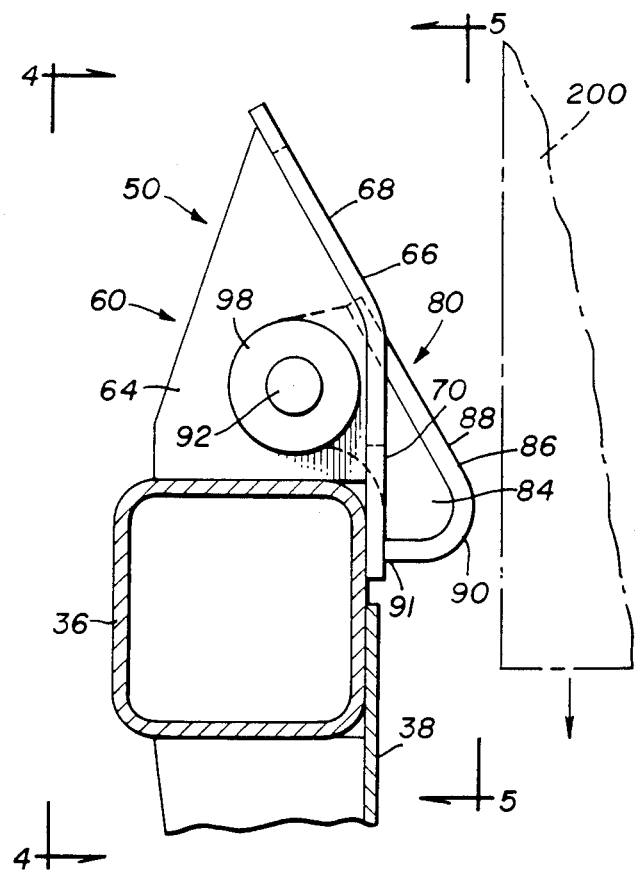
FIG. 3 is an enlarged view of the guide unit shown in FIG. 2 in operable position.

To the extent it is reasonable and practical the same or similar elements or parts in the various views of the drawings will be identified by the same numbers.

With reference to FIG. 1, identical well cars 20,22,24 are coupled together by a commercially available articulated coupler 26 located on the bolster of a standard two axle four wheel railroad truck 28. It is intended that the cars remain coupled together as in a unit train except for repairs and maintenance. It should be understood, however, that each car can have a conventional four wheel truck at each end so that it can be transported independently and be coupled to other types of cars of a train.

Well car 22 has a pair of identical longitudinal spaced apart parallel side walls 30,32 and identical end walls 34 near each end of the car thereby defining a well space in which at least one cargo container can be transported. A well car of this general type is disclosed in U.S. Pat. No. 4,456,413.

Each side wall 30,32 has a tube 36 at the top (FIGS. 1, 2 and 8). They function as major load bearing members. Additionally, each side wall 30,32 comprises a metal sheet or plate 38 extending from tube 36 downwardly and having a longitudinal horizontal angle member 40 at the bottom. The angle members 40 also function as load bearing members. A series of spaced apart vertical side wall braces 42 extend from each tube 36 to angle member 40 and are joined to plate 38. Near each end of each side wall 30,32 is located a stronger vertical side brace 44 which extends from tube 36 to near the lower edge of sheet 38. One or more lateral cross braces not shown are positioned in spaced apart arrangement and joined at their ends to the angles 40 to provide an open grid floor.

Near each end of the car side walls 30,32 a guide means unit 50 is connected to the top of tubes 36. Thus, there are two guide units on each side wall.

Each guide unit includes a movable element 80 mounted to a base 60 (FIGS. 2 to 7). Base 60 includes vertically positioned spaced apart identical plates 62,64 which terminate at the top in a triangular shape. The bottom of each plate 62,64 is welded to the top of tube 36. A plate 66 is welded to the front edges of plates 62,64. Plate 66 has a sloped upper portion 68 and a vertical lower portion 70 which is joined to the side of tube 36 (FIG. 3).

Figure 4:
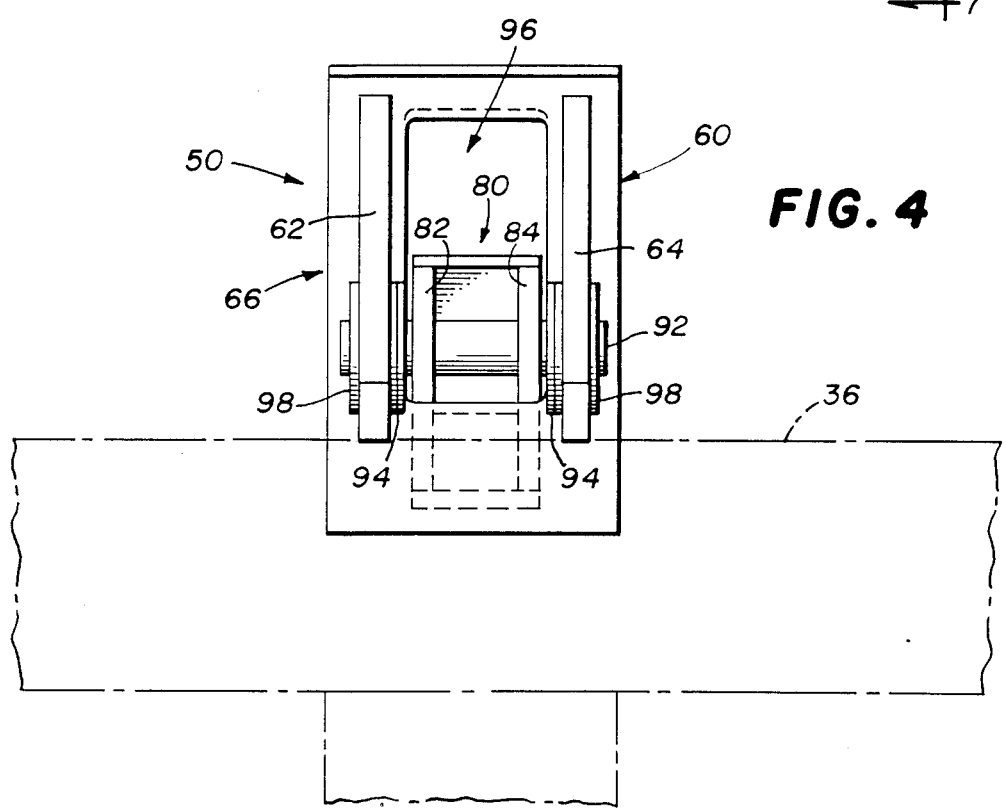
FIG. 4 is a rear elevational view of the guide unit taken along the line 4—4 of FIG. 3.

Movable element 80 includes two curved spaced apart flanges 82,84 (FIGS. 6 and 7) joined to a generally hook shaped web 86 which has a flat or planar surface 88 and a protruding nose portion 90. A horizontal hinge pin 92 extends through aligned holes in base plates 62,64 and flanges 82,84. Spacers 94 center element 80 so that when it rotates on hinge pin 92 it can pass through opening 96 in plate 66 (FIG. 4). Retainers 98 are mounted on the ends of hinge pin 92 to prevent it from being displaced axially.

With reference to FIG. 2, the unit 50 on the left tube 36 has the movable element 80 positioned in operable guide position and it is held in that position by gravity since the nose 90 ends in an edge 91 which contacts plate 70. A container 200 is shown in phantom being lowered into the well. The container 200 has a width of eight feet while the well width is slightly over eight feet six inches and is capable of receiving a container eight feet six inches wide. Thus, each guide means unit movable element 80 on each side wall 30,32 is designed to reduce the well width clearance three inches, for a total width reduction of six inches, when in operable position as shown in FIG. 2, left side, and FIGS. 3, 8 and 10.

When in operable position, the planar surface 88 slopes downwardly and is in approximately the same plane as surface 68 of the base 60 (FIG. 3). The thereby aligned sloping surfaces provide guide surfaces against which the lower longitudinal corners of the container 200 can slide when the container is being lowered into the well thus urging it into center position semi-automatically. Lowering of the container continues until it is supported by angles 40 or the well floor or both.

Figure 6:
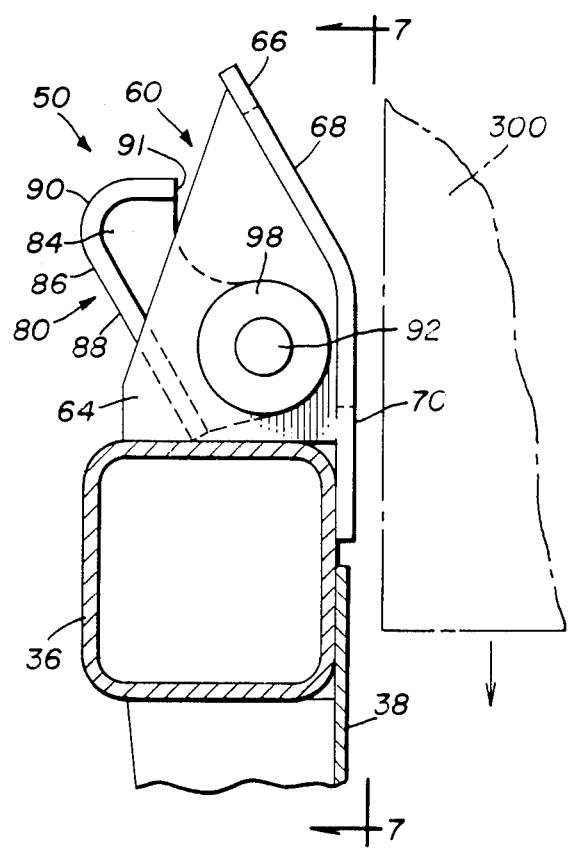
FIG. 6 is a sectional view taken along the line 6—6 of FIG. 1 and shows the guide unit in stored position.

The right side of FIG. 2, and FIGS. 6 and 9, show the unit 50 with the movable element 80 in its stored and inoperable position, it being maintained in such position by gravity. When all units 50 are so positioned a container 300 which is eight feet six inches wide can be lowered into the well. The sloped surfaces 68 of each base 60 guide the container into the well by providing surfaces against which the lower longitudinal corners of the container can slide.

FIGS. 9 to 12 illustrate the described container guide unit 50 equipped with a stop mechanism 110 which prevents accidental rotation of the movable element 80 and, additionally, with a war plate 140 which protects the top of side chord 36 from damage.

The stop mechanism 110, as shown in FIGS. 9 to 12, includes a hinge arm 112 made of a flat metal strip having one end welded to the end of hinge pin 92 so as to be about horizontally positioned, and pointing away from the car center, when the movable element 80 is in the stored position (FIG. 9). The stop mechanism 110 also includes a retainer finger 114 which is pivotally connected near the top by rivet 116 to the upper part of base plate 64. A protruding nose 118 on the lower end of finger 114 contacts the forward end of arm 112 and prevents the finger from rotating counterclockwise when the stop mechanism 110 is operatively positioned as shown in FIG. 9. Clockwise rotation of arm 112 is prevented with the mechanism 110 is so positioned because the outer end or arm 112 will contact the end of finger 114. Since arm 112 cannot rotate clockwise the movable element 80, which is welded to hinge pin 92, is prevented from rotating out of the stored position as shown in FIG. 9. When in stored position the lower end 120 of planar surface 88 rests loosely on top of wear plate 140 which thus protects the top of chord 36 against damage from element 80 bouncing or if a container hits the movable element 80 when in the stored position.

When the movable element 80 is to be moved from stored position (FIG. 9) to operable position (FIG. 10) the finger 114 is rotated clockwise to a position, such as shown in phantom in FIG. 9, which will permit unobstructed clockwise rotation of arm 112 for about 180° to the position shown in FIG. 10 thereby placing movable element 80 in operable position. To place movable element 80 in stored position it need only be rotated counterclockwise about 180° from the position shown in FIG. 10 to the position shown in FIG. 9.

The foregoing detailed description has been given for clearness of understanding only, and no unnecessary limitations should be understood therefrom, as modifications will be obvious to those skilled in the art.

What is claimed is:

1. A railroad car for carrying a container comprising:

a car body supported by rail truck means adapted for movement over a railroad;

the car body having opposing side walls and an end wall near each end connected to the side walls with said side walls and end walls defining a well in which a container can be received;

means for supporting the bottom of a container, when in the well;

guide means mounted along each side wall for effectively reducing the width of the well space so as to center in the well a container having a width significantly less than the well width and limit sideward movement of the container in the well when the car rocks;

the guide means comprising at least two spaced apart units along each side wall;

each unit having an element movable from a stored position in which the width of the well is maximum to an operable guide position which reduces the well width to center the container;

the element being movable about an axis from stored position to operable guide position;

the movable element being located on top of the side wall and the axis being horizontal;

the movable element having a forward nose portion which, when the element is in operable guide position, is adapted to be adjacent the wall of a container in the well;

the element having a downwardly sloped portion, extending to the nose portion, against which a container bottom side corner can slide to guide a container being lowered into the well;

the unit including a stationary base joined to the top of the side wall, the movable element being mounted to the base to rotate about a horizontal axis, the base having a sloped surface for guiding into the well a container having a width approximately the same as but smaller than the well width; and the base sloped surface and the movable element sloped portion forming a substantially common plane when the movable element is in operable guide position.

2. A railroad car for carrying a container comprising:

a car body supported by rail truck means adapted for movement over a railroad;

the car body having opposing side walls and an end wall near each end connected to the side walls with said side walls and end walls defining a well in which a container can be received;

means for supporting the bottom of a container, when in the well;

guide means mounted along each side wall for effectively reducing the width of the well space so as to center in the well a container having a width significantly less than the well width and limit sideward movement of the container in the well when the car rocks;

the guide means comprising at least two spaced apart guide units along each side wall;

each guide unit having a movable element fixedly mounted on a horizontal rotatable pin supported by the guide unit and movable from a stored position in which the width of the well is maximum to an operable guide position which reduces the well width to center the container;

each unit having a stop mechanism means which prevents accidental movement of the movable element from stored position to operable guide position;

the stop mechanism including an arm fixedly joined to the hinge pin so that the arm, hinge pin and movable element rotate as a unit; and a finger mounted on the guide unit which prevents accidental movement of the arm when the movable element is in stored position until the finger is intentinally moved to a position which permits movement of the arm so that the movable element can be rotated to operable guide position.

3. A railroad car for carrying a container comprising:

a car body supported by rail truck means adapted for movement over a railroad;

the car body having opposing side walls and an end wall near each end connected to the side walls with said side walls and end walls defining a well in which a container can be received;

means for supporting the bottom of a container, when in the well;

guide means mounted along each side wall for effectively reducing the width of the well space so as to center in the well a container having a width significantly less than the well width and limit sideward movement of the container in the well when the car rocks;

the guide means including a stationary base joined to the top of the side wall with the stationary base having a sloped surface for guiding a container;

the guide means including a movable element located on the top of the side wall and movable about an axis from a stored position in which the width of the well is maximum to an operable guide position which reduces the well width to center the container;

the movable element having a forward nose portion which, when the element is in operable guide position, is adapted to be adjacent the wall of a container in the well;

the movable element having a downwardly sloped portion, extending to the nose portion, against which a container bottom side corner can slide to guide a container being lowered into the well; and the stationary base sloped surface and the movable element sloped portion forming a substantially common plane when the movable element is in operable guide position.

* * * * *

UNITED STATES PATENT AND TRADEMARK OFFICE
CERTIFICATE OF CORRECTION

PATENT NO. : 4,754,709
DATED : July 5, 1988
INVENTOR(S) : HAROLD E. GRAMSE ET AL It is certified that error appears in the above-identified patent and that said Letters Patent is hereby corrected as shown below:

Front page, left column, last line, change "104/64" to -- 410/64 -- and right column, lines 1 and 3, change "Paulick" to -- Pavlick --; column 4, line 27, change "war" to -- wear -- and in line 42, delete "is".

Signed and Sealed this

Eighth Day of November, 1988

Attest:

DONALD J. QUIGG

Attesting Officer

Commissioner of Patents and Trademarks